(12) United States Patent
Priel et al.

(10) Patent No.: US 7,688,127 B2
(45) Date of Patent: Mar. 30, 2010

(54) METHOD FOR GENERATING A OUTPUT CLOCK SIGNAL HAVING A OUTPUT CYCLE AND A DEVICE HAVING A CLOCK SIGNAL GENERATING CAPABILITIES

(75) Inventors: Michael Priel, Hertzelia (IL); Lavi Koch, Jerusalem (IL); Anton Rozen, Gedera (IL)

(73) Assignee: Freescale Semiconductor, Inc., Austin, TX (US)

( * ) Notice: Subject to any disclaimer, the term of this patent is extended or adjusted under 35 U.S.C. 154(b) by 56 days.

(21) Appl. No.: 12/179,826

(22) Filed: Jul. 25, 2008

(65) Prior Publication Data

US 2010/0019821 A1    Jan. 28, 2010

(51) Int. Cl.
    *H03K 3/013*    (2006.01)
(52) U.S. Cl. .................. 327/291; 327/159; 327/161; 331/176
(58) Field of Classification Search ............. 327/155, 327/158–161, 291, 293, 298–299; 331/17, 331/57, 175–176
See application file for complete search history.

(56) References Cited

U.S. PATENT DOCUMENTS 5,355,502 A    10/1994    Schowe et al.
5,815,043 A *  9/1998    Chow et al. ............... 331/57
7,209,401 B2 * 4/2007    Norman et al. ........... 365/212

* cited by examiner

*Primary Examiner*—An T Luu

(57) ABSTRACT

A device and a method for generating a output clock signal having a output cycle, the method includes: (i) adjusting a delay of an adjustable ring oscillator to provide a high frequency clock signal having a short cycle so that the output cycle substantially equals a sum of integer multiples of a sleep cycle and integer multiplies of the short cycle; wherein the output cycle differs from any integer multiples of the sleep cycle; wherein the sleep cycle characterizes a sleep clock signal that is generated by a low frequency sleep clock; wherein the short cycle is shorter than the sleep cycle; (ii) counting short cycles and sleep cycles; and (iii) generating, during a sleep mode, in response to the counting and to a predefined counting pattern, the first clock signal; wherein the generating includes activating the adjustable ring oscillator only during a portion of a single sleep cycle per each output cycle.

20 Claims, 4 Drawing Sheets

METHOD FOR GENERATING A OUTPUT CLOCK SIGNAL HAVING A OUTPUT CYCLE AND A DEVICE HAVING A CLOCK SIGNAL GENERATING CAPABILITIES

FIELD OF THE INVENTION

This invention relates to devices and methods for generating a first clock signal having an output cycle.

BACKGROUND OF THE INVENTION

Integrated circuits and especially battery powered integrated circuits are expected to apply aggressive power saving techniques. A commonly used power saving technique involves shutting down (when operating in a so-called sleep mode) certain circuits such as high frequency clocks, phase locked loops and the like.

The circuits that remain active during this sleep mode are expected to perform various functions. For example, operating devices demand accurate tick times. A Common tick time is 1 Mili-Second (mSec). In some known devices a sleep clock is active during the sleep mode which generates a sleep clock signal that has a frequency of 32.768 Khz. Accordingly, the sleep clock signal has a sleep cycle of 30.5 usec. This sleep cycle defines the accuracy of the tick clock and this accuracy may not suffice.

SUMMARY OF THE INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE PREFERRED EMBODIMENTS

A device and method are provided. The device and method provide a trade-off between power consumption and timing accuracy.

Figure 1:
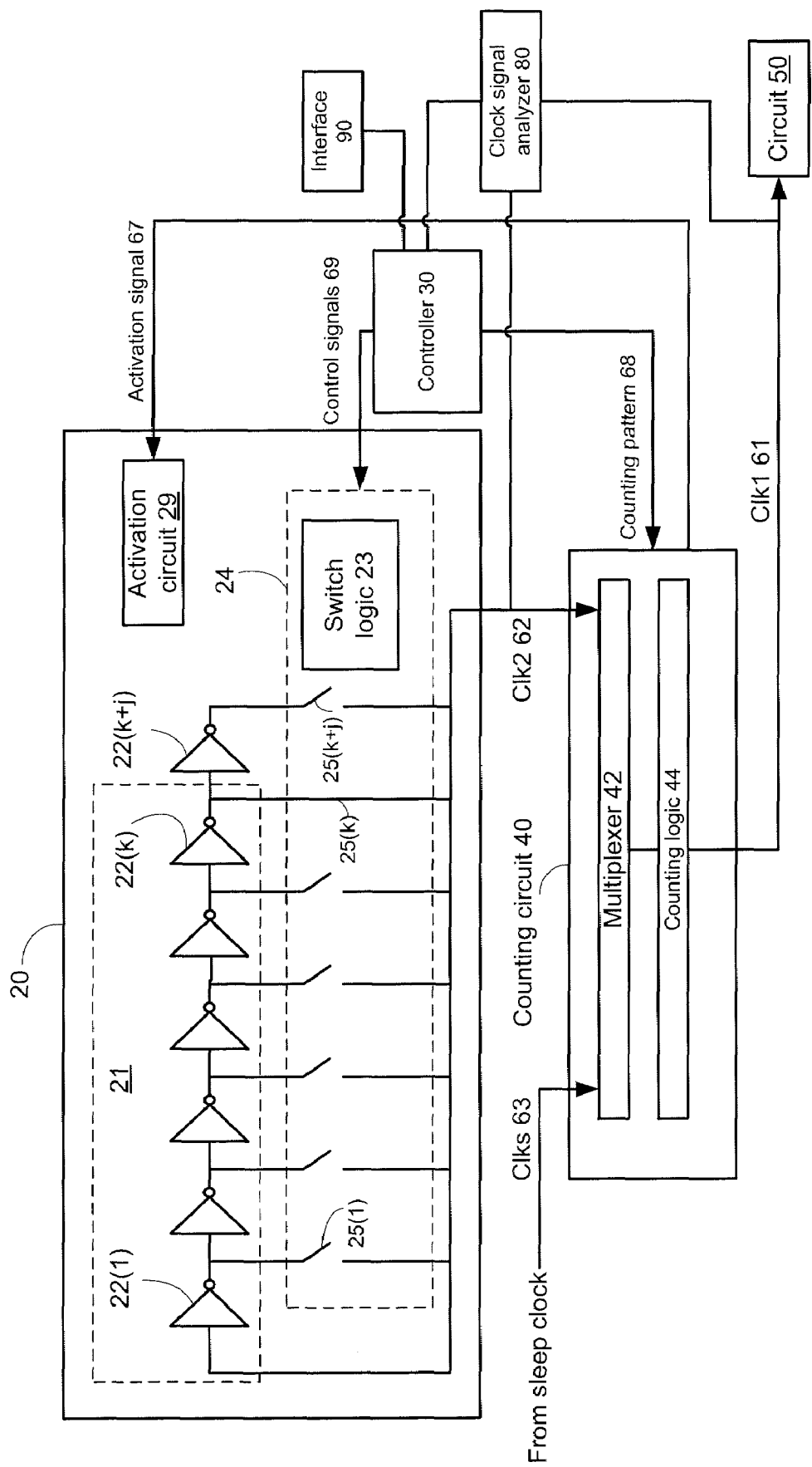
FIG. 1 schematically shows an example of an embodiment of a device having clock signal generating capabilities.

FIG. 1 schematically shows an example of an embodiment of device 10 having clock signal generating capabilities.

Device 10 includes adjustable ring oscillator 20, controller 30, counting circuit 40, circuit 50, interface 90 and clock signal analyzer 80.

When device 10 enters a sleep mode various circuits (not shown) of device 10 are deactivated. Device 10 is maintained at a sleep mode during a sleep period.

Figure 3:
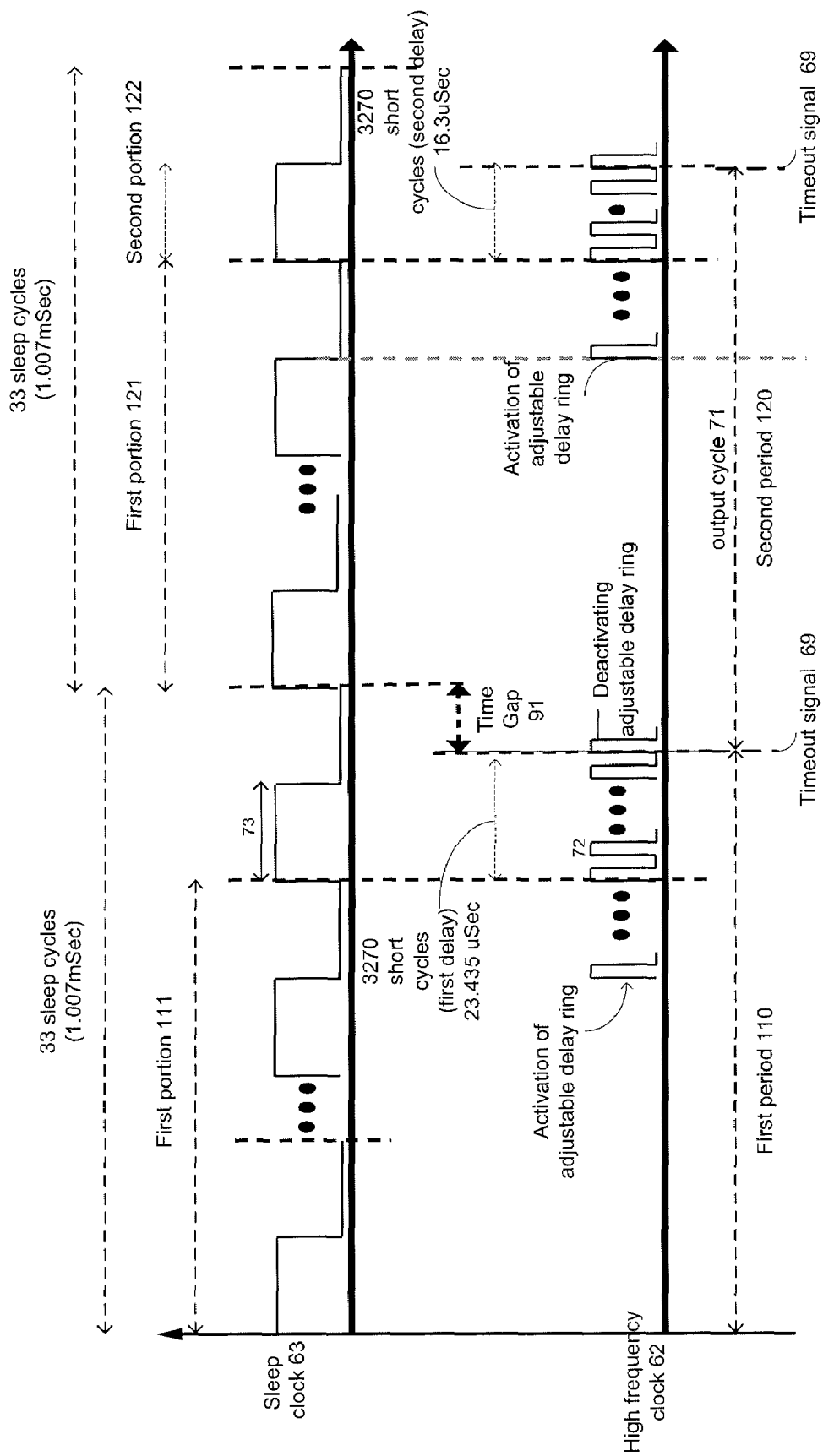
FIG. 3 schematically shows a timing diagram of various clock signals of an example of embodiment of the device having clock signal generating capabilities.

Circuit 50 receives, during a sleep period, output clock signal (denoted Clk1 61). Circuit 50 can be a processor but this is not necessarily so. Output clock signal 61 is generated by counting circuit 40 and has a output cycle 71. The accuracy of output cycle 71 is responsive to various factors such as a frequency of a high frequency clock signal (denoted Clk2 62) that is generated by adjustable ring oscillator 20. Second clock signal 62 has a short cycle (denoted 72 in FIG. 3).

Device 10 can also include at least one of the following components or can be connected to one or more of these following components: (i) a memory unit for storing information such as a counting pattern, one or more values of temperatures and/or humidity levels, (ii) a temperature sensor, (iii) a humidity sensor; (iv) sleep clock, and the like. For simplicity of explanation these components are not shown.

The various clock signals (output clock signal 61, high frequency clock signal 62 and sleep clock signal 63) fulfil the following conditions: (i) output cycle 71 differs from any integer multiples of sleep cycle 73; (ii) sleep cycle 73 is much longer then short cycle 72; (iii) output cycle 71 substantially equals a sum of integer multiples of sleep cycle (denoted 73 in FIG. 3). and integer multiples of short cycle 72.

Sleep cycle 73 can be few hundred times (and even few thousand times) longer than short cycle 71. For example, sleep cycle 73 can be about 30.5 micro-seconds (uSec) while short cycle 72 can be about 0.005 uSec.

In this example, adjustable ring oscillator 20 includes multiple inverters 22(1)-22(k+j) that are connected in a sequential manner. Adjustable ring oscillator 20 also includes a coupling circuitry 24 that determines the length of a chain 21 of inverters that participate in generating high frequency clock signal 62. It is noted that chain 21 of inverters can include all inverters of adjustable ring oscillator (to provide a maximal delay value) or a portion thereof.

FIG. 1 illustrates a chain 21 of inverters as including k out of (k+j) inverters of adjustable ring oscillator 20. Chain 21 includes inverters 22(1)-22(k)—as the output of the k'th inverter (22(k)) is connected (via k'th switch 25(k)) to the input of first inverter 22(1). At any given time a single switch out of the multiple switches is closed. The switches are controlled by switch logic 23. Switch logic 23 can receive control signals 69 from controller 30 in order to determine the length of chain 21. Coupling circuitry 24 includes switch logic 23 and switches 25(1)-25(k+j). Indices k and j are integers. Index j can equal one or can be greater than one.

It is noted that although FIG. 1 illustrates a switch per inverter that this is not necessarily so. For example, a switch can be allocated per multiple inverters (for example—per three inverters).

Adjustable ring oscillator 20 can provide high frequency clock signal 62 of a high frequency. It is deactivated most of the time, in order to preserve power. Ring oscillator does not need a long stabilization period (as required by phase locked loops), thus is can be powered only when needed and for shorter periods of time in relation to a phase locked loop. Adjustable ring oscillator 20 can also be frequently adjusted. Adjustable ring oscillator 20 can include an activation circuit 29 that activates adjustable ring oscillator 20 when needed. Activation circuit 29 receives an activation signal 67 from counting circuit 40. Activation circuit 29 can selectively disconnect inverters 22(1)-22(k+j) from their power supply or otherwise deactivate these inverters.

Adjustable ring oscillator 20 generates high frequency clock signal Clk2 62 that has a short cycle 72.

Controller 30 is adapted to adjust the delay (D) of the adjustable ring oscillator 20. It sends to the adjustable ring 20 one or more control signals (such as control signals 69) that determines the length of chain of inverters 21. Delay D of adjustable ring oscillator 20 equals the aggregate delays of inverters (for example 22(1)-22(k)) the are included in chain 21.

The delay of the adjustable ring oscillator 20 is adjusted so that output cycle 71 substantially equals a sum of integer multiples of a sleep cycle 73 and integer multiples of the short cycle 72. Controller 30 can also determine which delay of adjustable ring oscillator 20 is required at any given moment.

Figure 2:
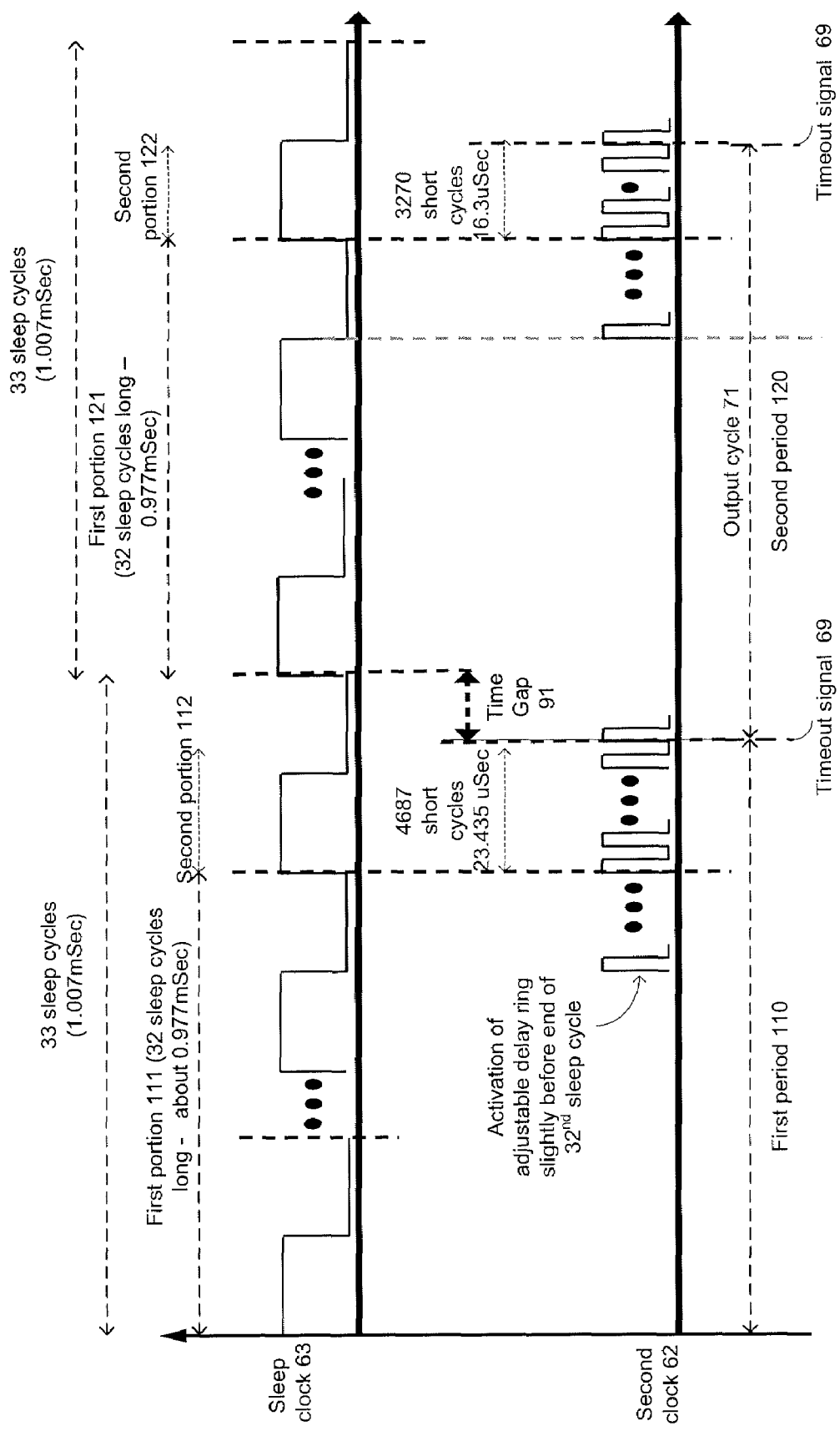
FIG. 2 schematically shows a timing diagram of various clock signals of an example of embodiment of the device having clock signal generating capabilities.

FIG. 2 schematically shows a timing diagram of various clock signals of an example of embodiment of the device having clock signal generating capabilities.

FIG. 2 illustrates sleep clock signal 63 and high frequency clock signal 62 during two example periods 110 and 120, each being an output cycle long. First period 110 includes first portion 111 and second portion 112. Second period 120 includes first portion 121 and second portion 122. It is assumed, for simplicity of explanation, that a cycle of any clock signal starts by a positive edge. It is noted that this is not necessarily so.

During first period 110, the positive edge of output clock signal 61 coincides with a positive edge of sleep clock signal 63. Counting circuit 40 counts an integer multiple, for example, thirty two cycles from the occurrence of sleep clock signal 63 of the positive edge of the output signal 61 during first portion 111. Accordingly, in this example, first portion 111 is 0.977 mSec long. Adjustable ring oscillator 20 is activated slightly before second portion 112 starts and remains active during second portion 112 of first period 110. During second portion 112 counting circuit 40 counts an integer multiple, for example, 4687 cycles of high frequency clock signal 62. Accordingly, second portion 112 is 23.435 uSec long. In this example, the aggregate length of first and second portions 111 and 112 is 1.000435 mSec.

The thirty-third rising edge of sleep clock signal 63 starts 1.007 mSec after the beginning of first period 110. Accordingly, a time gap is present between the end of first period 110 (occurring after 1.000435 mSec) and the occurrence of the thirty third rising edge of sleep clock signal 63 (occurring after 1.0007 mSec). Thus, the next output clock cycle should start 0.9993 mSec after the occurrence of the end the thirty third rising edge of sleep clock signal 63 and the counting of that cycle should take into account this fact. Adjustable ring oscillator 20 is deactivated immediately after first period 110 ended but is activated (and is maintained active) during second portion 122 of second period 120. Second portion 122 is shorter than second portion 112. Especially, during second portion 122 counting circuit 40 counts only 3270 cycles of adjustable ring oscillator 20.

The number of cycles to be counted during each (output cycle long) period can be in a form of a counting pattern, such as counting pattern 68 that is provided to counting circuit 40. Counting pattern 68 may include multiple pairs of integers, wherein at least two pairs of integers differ from each other. Each pair of integers includes a sleep clock integer (such as but not limited to 32) and a second clock integer (such as 4687 and 3270).

A counting pattern can also include only a single pair of integers. When such a counting pattern is provided the delay of adjustable ring oscillator 20 is changed per output cycle. Referring to the example set fourth in FIG. 3, counting circuit 40 counts 3270 cycles of adjustable ring oscillator 20 during each of second portion 112 of first period 110 and second portion 122 of second period 120. The different lengths of these second portions mandates that the delay of adjustable ring oscillator 20 differs from portion to the other. This configuration greatly simplifies the controlling of the control circuit 14.

Referring back to the FIG. 1, controller 30 can determine a delay of adjustable ring oscillator 20 or can receive (for example via interface 90) information indicative of the desired delay of adjustable ring oscillator 20.

Additionally or alternatively, the delay of adjustable ring oscillator 20 can be adjusted for various reasons that may include at least one of the following or a combination thereof: (i) an occurrence of a predefined change of a temperature of device 10; (ii) an occurrence of a predefined change of a humidity level of the surroundings of device 10, (iii) clock cycle drifts, especially sleep clock cycle drifts, (iv) an occurrence of a timing gap that exceeds a timing threshold; wherein the timing gap is a difference between a desired output cycle and a output cycle obtained by the counting circuit 20. The timing gap can occur (even at the absence of any clock signal drift) due to differences between a desired clock cycle (for example 1 mSec) and the short cycle (for example 0.005 mSec).

The temperature can change due to ambient temperature changes or due to heating or cooling effects that are result from changes in the power consumed by semiconductor circuits.

The delay of adjustable ring oscillator 20 can be adjusted each output cycle or each group of output cycles. Different groups of cycles can be of equal length or may differ from each other.

Changes in clock cycles (for example—clock signal drifts) can be evaluated in various manners. For example, clock signal analyzer 80 can count the number of second clock cycles within a single sleep cycle and detect deviations from an expected number. Additionally or alternatively, clock signal analyzer 80 can measure clock signal jitters. The outcome of this analysis is sent to controller 30 that can trigger a delay adjustment, alter a counting pattern 68 or respond in another manner.

At least one adjustment of the delay can occur during (or after) a manufacturing process of an integrated circuit that includes (or is included within) device 10. This adjustment can compensate for manufacturing process variations that can affect the delay of the inverters of ring oscillator 20.

Figure 4:
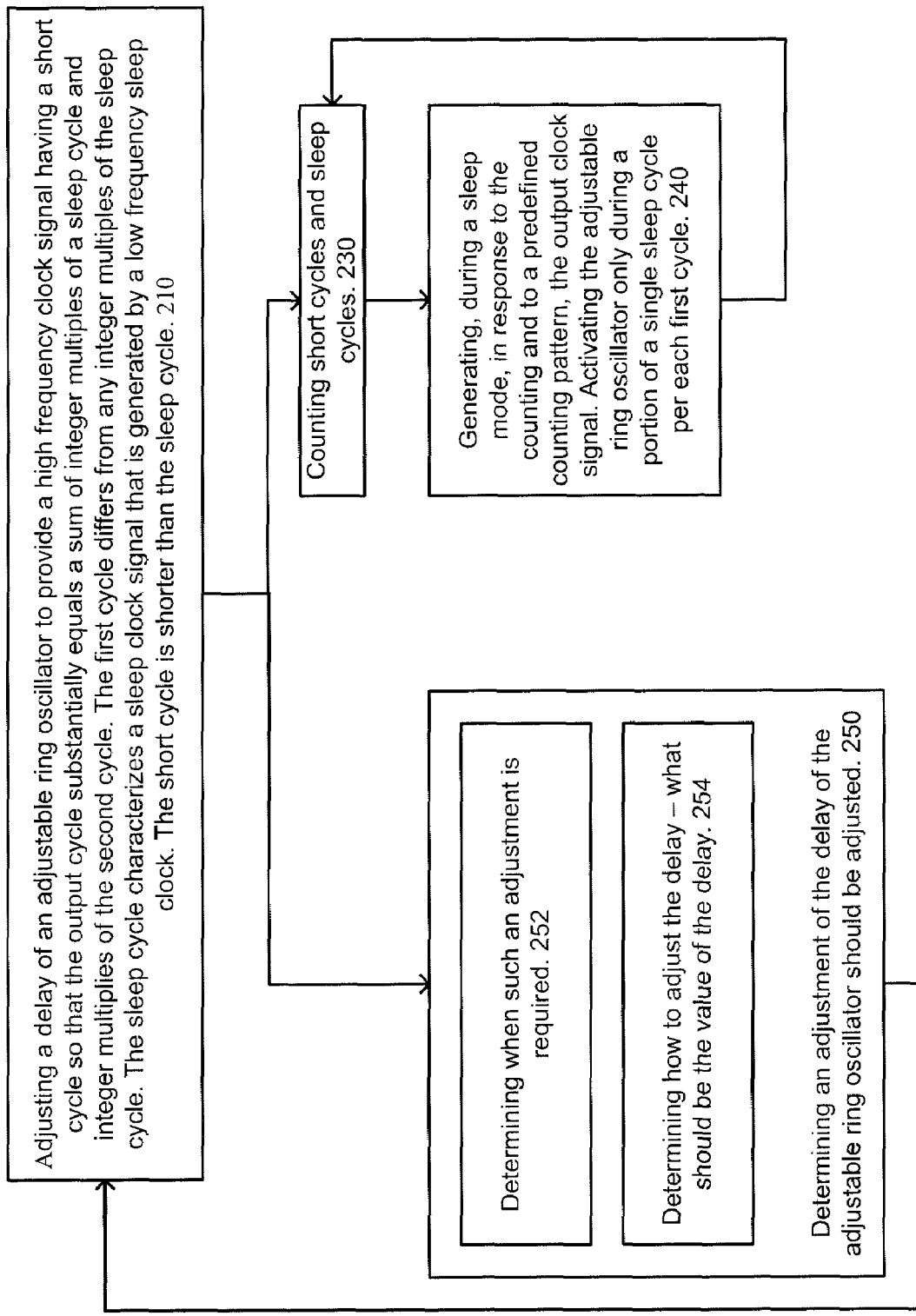
FIG. 4 schematically shows an example of embodiment of a method for generating a first clock signal.

FIG. 4 schematically shows an example of embodiment of method 200 for generating a first clock signal.

Method 200 starts by stage 210 of adjusting a delay of an adjustable ring oscillator to provide a high frequency clock signal having a short cycle so that the output cycle substantially equals a sum of integer multiples of a sleep cycle and integer multiples of the short cycle. The output cycle differs from any integer multiples of the sleep cycle. The sleep cycle characterizes a sleep clock signal that is generated by a low frequency sleep clock. The short cycle is shorter then the sleep cycle.

Stage 210 can include adjusting a length of a chain of inverters of the adjustable ring oscillator that generates the high frequency clock signal.

Stage 210 is followed by stages 230 and 250.

Stage 230 includes counting short cycles and sleep cycles.

Stage 230 is followed by stage 240 of generating, during a sleep mode, in response to the counting and to a predefined counting pattern, the output clock signal. Stage 240 includes activating the adjustable ring oscillator only during a portion of the sleep cycle, for example, only during a single cycle per each output cycles. After stage 240 the cycle of stage 230 and stage 240 is repeated.

Stage 240 of generating can be responsive to a counting pattern. Method 200 can include either receiving the counting pattern (stage 261) or determining the counting pattern (stage 264).

The counting pattern can include multiple pairs of integers and at least two pairs of integers may differ from each other. Each pair of integers includes a sleep clock integer and a second clock integer. The output cycle substantially equals a sleep clock integer of sleep cycles plus a second clock integer of short cycles.

Alternatively, the counting pattern includes only a single pair of integers.

Stage 250 includes determining whether the delay of the adjustable ring oscillator should be adjusted. Stage 250 can include stage 252 of determining when such an adjustment is required and stage 254 of determining how to adjust the delay—what should be the value of the delay.

Stage 250 can include determining to adjust the delay of the adjustable ring oscillator each output cycle. Thus, stage 210 of adjusting will be repeated each output cycle.

Stage 250 can include determining to adjust the delay of the adjustable ring oscillator each group of output cycle. Thus, stage 210 of adjusting will be repeated each group of output cycles.

Stage 250 can include determining to adjust the delay of the adjustable ring oscillator in order to prevent a timing gap to exceed a timing threshold; wherein the timing gap is a difference between a output cycle and a cycle obtained by counting sleep cycles and short cycles. Thus, stage 210 of adjusting will be repeated in order to prevent the timing gap from exceeding the timing threshold.

Stage 250 can be executed during (or after) a manufacturing process of an integrated circuit that comprises the sleep clock and the adjustable ring oscillator. Stage 250 can also be executed while the device is utilized.

Stage 250 can include determining to adjust the delay of the adjustable ring oscillator in response to a predefined change of a temperature or of a humidity level. Thus, stage 210 of adjusting is executed in response to such a predefined change.

Stage 250 can include determining to adjust the delay of the adjustable ring oscillator in response in response to a drift of the at least the sleep cycle. Thus, stage 210 of adjusting is executed in response to such a drift.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, FIG. 1 illustrates controller as being included in configurable receiver but this is not necessarily so. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

We claim:

1. A method for generating an output clock signal having an output cycle, the method comprises:

adjusting a delay of an adjustable ring oscillator to provide a high frequency clock signal having a short cycle so that the output cycle substantially equals a sum of integer multiples of a sleep cycle and integer multiplies of the short cycle;

wherein the output cycle differs from any integer multiples of the sleep cycle;

wherein the sleep cycle characterizes a sleep clock signal that is generated by a low frequency sleep clock;

wherein the short cycle is shorter then the sleep cycle;

counting short cycles and sleep cycles; and generating, during a sleep mode, in response to the counting and to a predefined counting pattern, the output clock signal;
wherein the generating comprises activating the adjustable ring oscillator only during a portion of a single sleep cycle per each output cycle.

2. The method according to claim 1 wherein the adjusting comprises adjusting a length of a chain of inverters of the adjustable ring oscillator that generates the high frequency clock signal.

3. The method according to claim 1 comprising:
determining or receiving the predefined counting pattern;
wherein the predefined counting pattern comprises multiple pairs of integers;
wherein at least two pairs of integers differ from each other;
wherein each pair of integers comprises a sleep clock integer and a second clock integer;
wherein the output cycle substantially equals a sleep clock integer of sleep cycles plus a second clock integer of short cycles.

4. The method according to claim 1 comprising determining or receiving the predefined counting pattern that comprises only a single pair of integers; wherein the single pair of integers comprises a sleep clock integer and a second clock integer; wherein the output cycle substantially equals a sleep clock integer of sleep cycles plus a second clock integer of short cycles.

5. The method according to claim 1 comprising adjusting the delay of the adjustable ring oscillator each output cycle.

6. The method according to claim 1 comprising adjusting the delay of the adjustable ring oscillator each group of output cycles.

7. The method according to claim 1 comprising adjusting the delay of the adjustable ring oscillator each output cycle in order to prevent a timing gap to exceed a timing threshold;
wherein the timing gap is a difference between a output cycle and a cycle obtained by counting sleep cycles and short cycles.

8. The method according to claim 1 comprising adjusting the delay of the adjustable ring oscillator during a manufacturing process of an integrated circuit that comprises the sleep clock and the adjustable ring oscillator.

9. The method according to claim 1 comprising adjusting the delay of the adjustable ring oscillator in response to a predefined change of a temperature or of a humidity level.

10. The method according to claim 1 comprising activating the adjustable ring oscillator in response to a drift of the at least the sleep cycle.

11. A device having a clock signal generating capabilities, the device comprises:
an adjustable ring oscillator adapted to generate a high frequency clock signal;
wherein a short cycle of the high frequency clock signal is responsive to an adjustable delay of the adjustable ring oscillator;
a controller, adapted to control an adjustment of the delay of the adjustable ring so that the output cycle substantially equals a sum of integer multiples of a sleep cycle and integer multiplies of the short cycle;
wherein the output cycle differs from any integer multiples of the sleep cycle;
wherein the sleep cycle characterizes a sleep clock signal that is generated by a low frequency sleep clock;
wherein the short cycle is shorter then the sleep cycle;
a counting circuit adapted to receive the sleep clock signal and the high frequency clock signal, count short cycles and sleep cycles and generate, during a sleep mode, and in response to a predefined counting pattern, the output clock signal;
wherein the adjustable ring oscillator is activated only during a portion of a single sleep cycle per each output cycle.

12. The device according to claim 11 wherein the adjustable ring oscillator comprises a chain of inverters having an adjustable length and wherein the adjustable delay is responsive to the length of the chain of inverters.

13. The device according to claim 11 wherein:
the counting circuit receives the predefined counting pattern;
the predefined counting pattern comprises multiple pairs of integers;
at least two pairs of integers differ from each other;
each pair of integers comprises a sleep clock integer and a second clock integer;
the output cycle substantially equals a sleep clock integer of sleep cycles plus a second clock integer of short cycles.

14. The device according to claim 11 wherein:
the counting circuit receives the predefined counting pattern that comprises only a single pair of integers;
the single pair of integers comprises a sleep clock integer and a second clock integer;
the output cycle substantially equals a sleep clock integer of sleep cycles plus a second clock integer of short cycles.

15. The device according to claim 11 wherein the adjustable ring oscillator adjusts the delay of the adjustable ring oscillator each output cycle.

16. The device according to claim 11 wherein the adjustable ring oscillator adjusts the delay of the adjustable ring oscillator each group of output cycles.

17. The device according to claim 11 wherein:
the adjustable ring oscillator adjusts the delay of the adjustable ring oscillator each in order to prevent a timing gap to exceed a timing threshold;
the timing gap is a difference between the output cycle and a cycle obtained by the counting.

18. The device according to claim 11 wherein the adjustable ring oscillator adjusts the delay of the adjustable ring oscillator during manufacturing process of an integrated circuit that comprises the sleep clock and the adjustable ring oscillator.

19. The device according to claim 11 wherein the adjustable ring oscillator adjusts the delay of the adjustable ring oscillator in response to a predefined change of a temperature or of a humidity level.

20. The device according to claim 11 wherein the adjustable ring oscillator adjusts the delay of the adjustable ring oscillator in response to a drift of the at least the sleep cycle.

* * * * *